(12) United States Patent
Huang et al.

(10) Patent No.: US 7,322,118 B2
(45) Date of Patent: Jan. 29, 2008

(54) NON-CONTACT ELECTRONIC LEVEL

(75) Inventors: Chaochi Huang, Taipei (TW);
Chih-Yung Cheng, Taipei (TW);
Kung-Ho Su, Sijhih (TW);
Ching-Horng Hsiao, Shalu Township,
Taichung County (TW); Shih-Chang
Chang, Sinhua Township, Tainan
County (TW)

(73) Assignee: Quarton, Inc. (TW)

( * ) Notice: Subject to any disclaimer, the term of this patent is extended or adjusted under 35 U.S.C. 154(b) by 0 days.

(21) Appl. No.: 11/083,456

(22) Filed: Mar. 18, 2005

(65) Prior Publication Data
US 2006/0048400 A1 Mar. 9, 2006

Related U.S. Application Data

(63) Continuation-in-part of application No. 10/933,985, filed on Sep. 3, 2004, now abandoned.

(51) Int. Cl.
G01C 9/06 (2006.01)

(52) U.S. Cl. ...................... 33/366.23; 33/379

(58) Field of Classification Search ............. 33/366.11, 33/366.15, 366.23, 379, 348.2, 366.16
See application file for complete search history.

(56) References Cited

U.S. PATENT DOCUMENTS

| | | | |
|---|---|---|---|
| 4,110,609 A | 8/1978 | Beer | 33/366.11 |
| 4,164,077 A | 8/1979 | Thomas | 33/366.23 |
| 4,503,622 A | 3/1985 | Swartz et al. | 33/366.14 |
| 5,780,848 A | 7/1998 | Thompson et al. | 33/366.11 |
| 6,204,498 B1 | 3/2001 | Kumagai et al. | 33/366.11 |
| 6,647,634 B2 | 11/2003 | Yang et al. | 33/366.23 |
| 2006/0005407 A1* | 1/2006 | Lippuner | 33/366.23 |

FOREIGN PATENT DOCUMENTS

| | | |
|---|---|---|
| JP | 3-138504 | 3/1991 |
| JP | 9-250926 | 9/1997 |
| JP | 2003-269956 | 9/2003 |

* cited by examiner

Primary Examiner—G. Bradley Bennett
(74) Attorney, Agent, or Firm—Raymond Sun

(57) ABSTRACT

A non-contact electronic level has a light source, a vial having a bubble and positioned to be irradiated by light from the light source, and a photo sensor located at a position corresponding to the bubble at a fixed distance from the vial. The photo sensor captures an image of the bubble after the vial is irradiated by the light source. An image processing unit is electrically coupled to the photo sensor and converts the image of the bubble into an electronic level signal by comparing the centroid of the image of the bubble with a predetermined point.

13 Claims, 12 Drawing Sheets

NON-CONTACT ELECTRONIC LEVEL

RELATED CASES

This is a continuation-in-part of Ser. No. 10/933,985, filed Sep. 3, 2004 now abandoned, whose disclosure is incorporated by this reference as though set forth fully herein.

BACKGROUND OF THE INVENTION

1. Field of the Invention

The present invention relates to a level, and more particularly, to a non-contact electronic level.

2. Description of the Prior Art

Various forms of levels have been used as devices to enable the operator to determine when a particular surface is horizontal. Early levels consisted of a body of liquid in an open vessel since liquid is known to form a flat, horizontal surface. The surface of the liquid formed a reference surface which served as the standard against which the horizontal character of a second surface was estimated (e.g., an inclination direction and an inclination angle). This basic principle has evolved into a bubble level where a bubble is trapped in a body of liquid, with the liquid being enclosed in an upwardly curved, clear tube. An improved design uses a transparent ball instead of the clear tube for holding the liquid, enabling the bubble to move in all four directions of the plane thereon so that the user does not need to pivot the level at an angle of ninety degrees over and over again while measuring.

FIG. 1 illustrates another conventional level 100 which has a casing 102, an electrolyte 104 which has an air bubble 108 floating thereon, and a plurality of metal electrodes 106. The electrolyte 104 is placed in the casing 102, and the metal electrodes 106 pass through the casing 102 and soak in the electrolyte 104. If the air bubble 108 moves along the surface of the casing 102 when the level 100 is tilted, the resistance between the metal electrodes 106 will change as the air bubble 108 moves. Therefore, the horizontal position of the level 100 can be detected using the change of such resistance.

However, the level 100 in FIG. 1 still suffers from numerous drawbacks:

1. After the metal electrodes 106 have been used for a period of time, the surface of the metal electrodes 106 will be corroded and the resistance thereof will be affected, such that the accuracy and sensitivity of the level 100 are reduced.

2. The electrolyte 104 must be changed regularly to maintain a proper ion concentration.

3. Even if the metal electrodes 106 and the electrolyte 104 are changed regularly, the resistance can still be varied by the gradual corrosion of the electrodes 106 and the gradual consumption of the electrolyte 104, thereby affecting the accuracy and sensitivity of the level 100.

4. The electrolyte 104 is vulnerable to the temperature of the environment, such that the temperature variation of the surrounding environment will affect the conductivity of the electrolyte 104, thereby reducing the accuracy and sensitivity of the level 100.

SUMMARY OF THE INVENTION

It is an object of the present invention to provide a non-contact electronic level that obtains a precise electronic level signal so as to enhance the precision, sensitivity, and testing reliability of the electronic level.

It is another object of the present invention to provide a non-contact electronic level which avoids using corrosive electrolytes, but which uses light as a medium to effectively extend the life of the electronic level.

In order to achieve the objectives of the present invention, there is provided a non-contact electronic level that has a light source, a vial having a bubble and positioned to be irradiated by light from the light source, and a photo sensor located at a position corresponding to the bubble at a fixed distance from the vial. The photo sensor captures an image of the bubble after the vial is irradiated by the light source. An image processing unit is electrically coupled to the photo sensor and converts the image of the bubble into an electronic level signal by comparing the centroid of the image of the bubble with a predetermined point.

The present invention also provides a method of measuring a level which includes using a light source to irradiate a vial having a bubble therein, capturing an image of the bubble after the vial is irradiated by the light source, converting the image of the bubble into an electronic level signal by comparing the centroid of the image of the bubble with a predetermined point, and adjusting the inclination of the bubble based on the electronic level signal.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
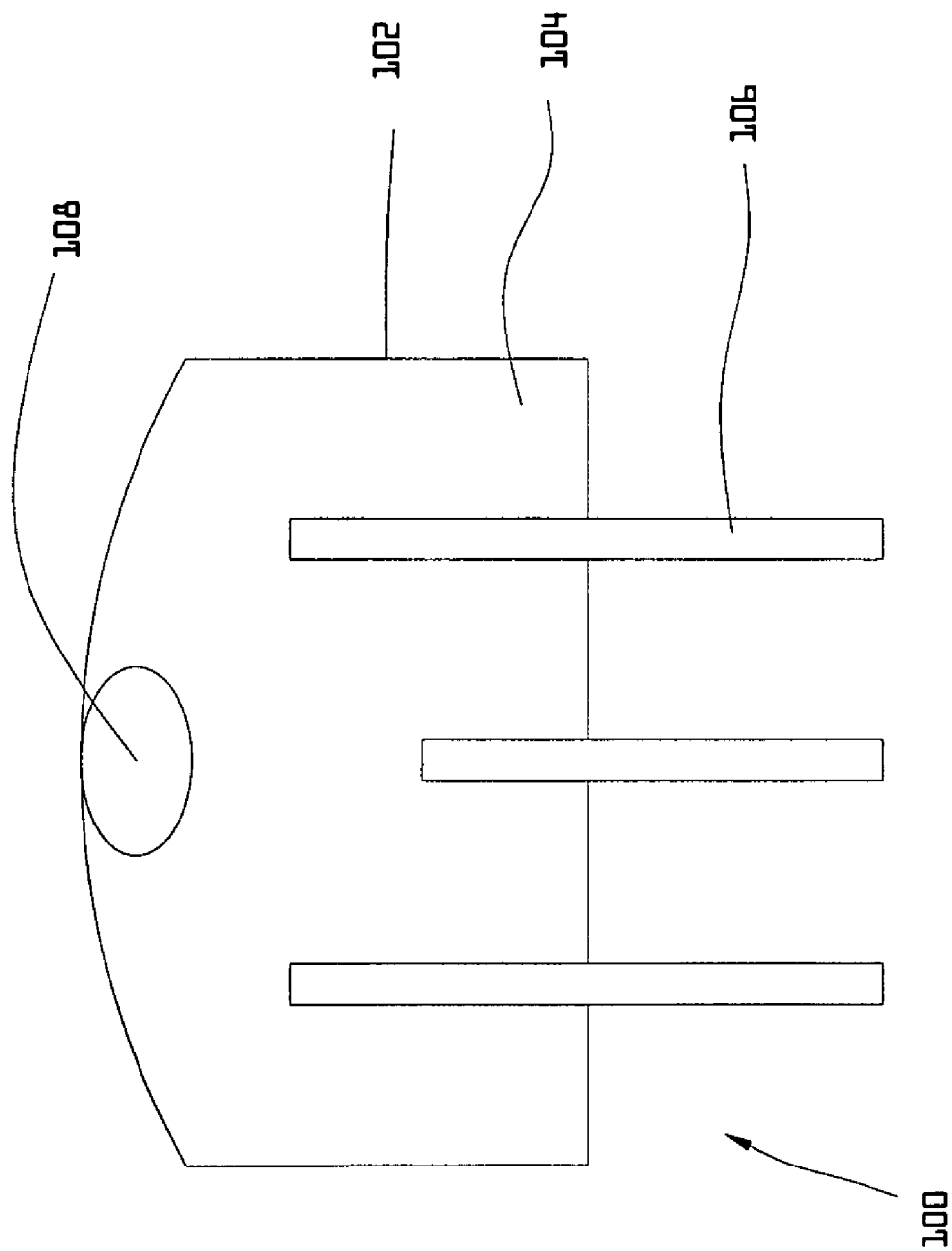
FIG. 1 illustrates a conventional level.
Figure 2A:
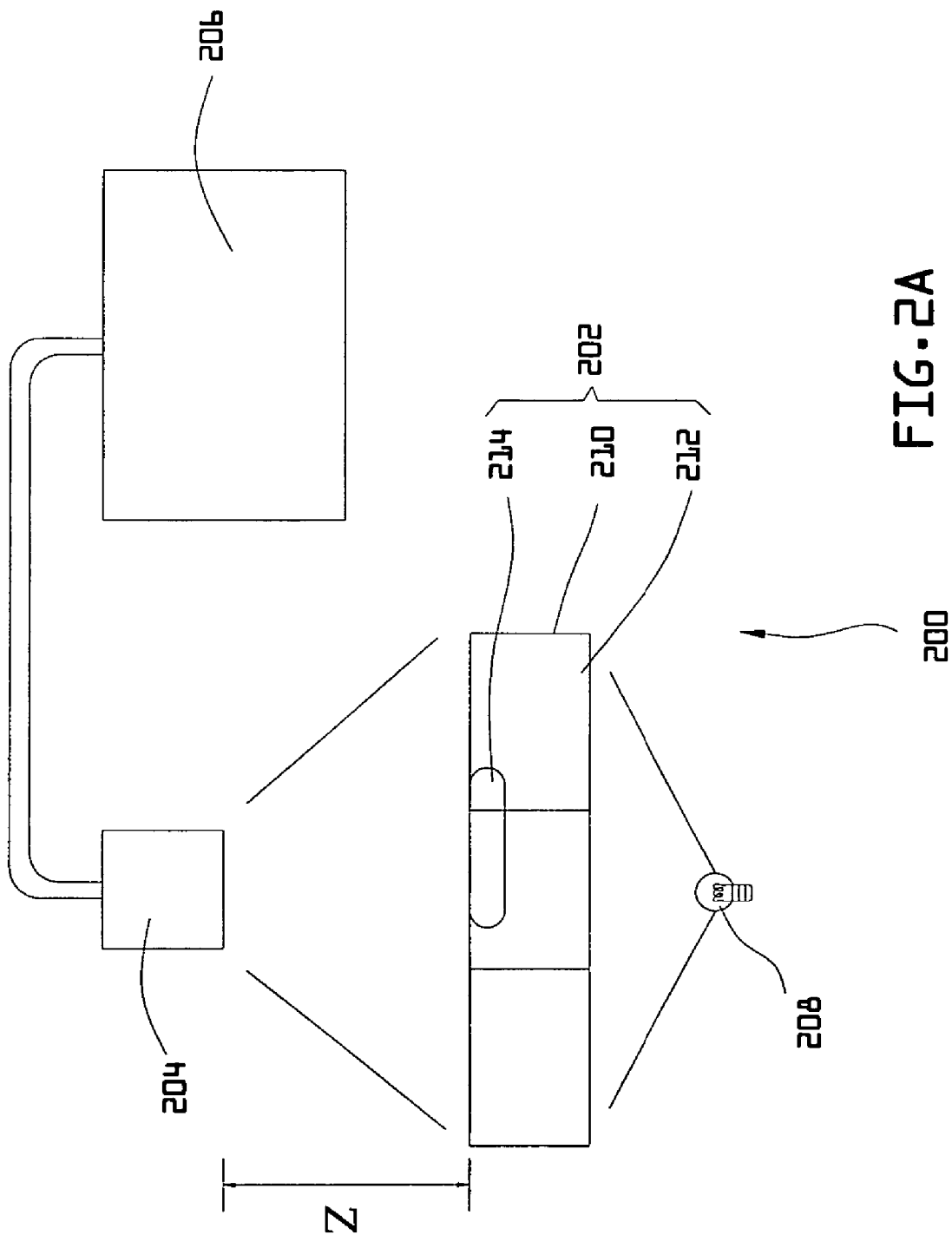
FIG. 2A illustrates a non-contact electronic level according to one embodiment of the present invention showing the vial tilted.
Figure 2B:
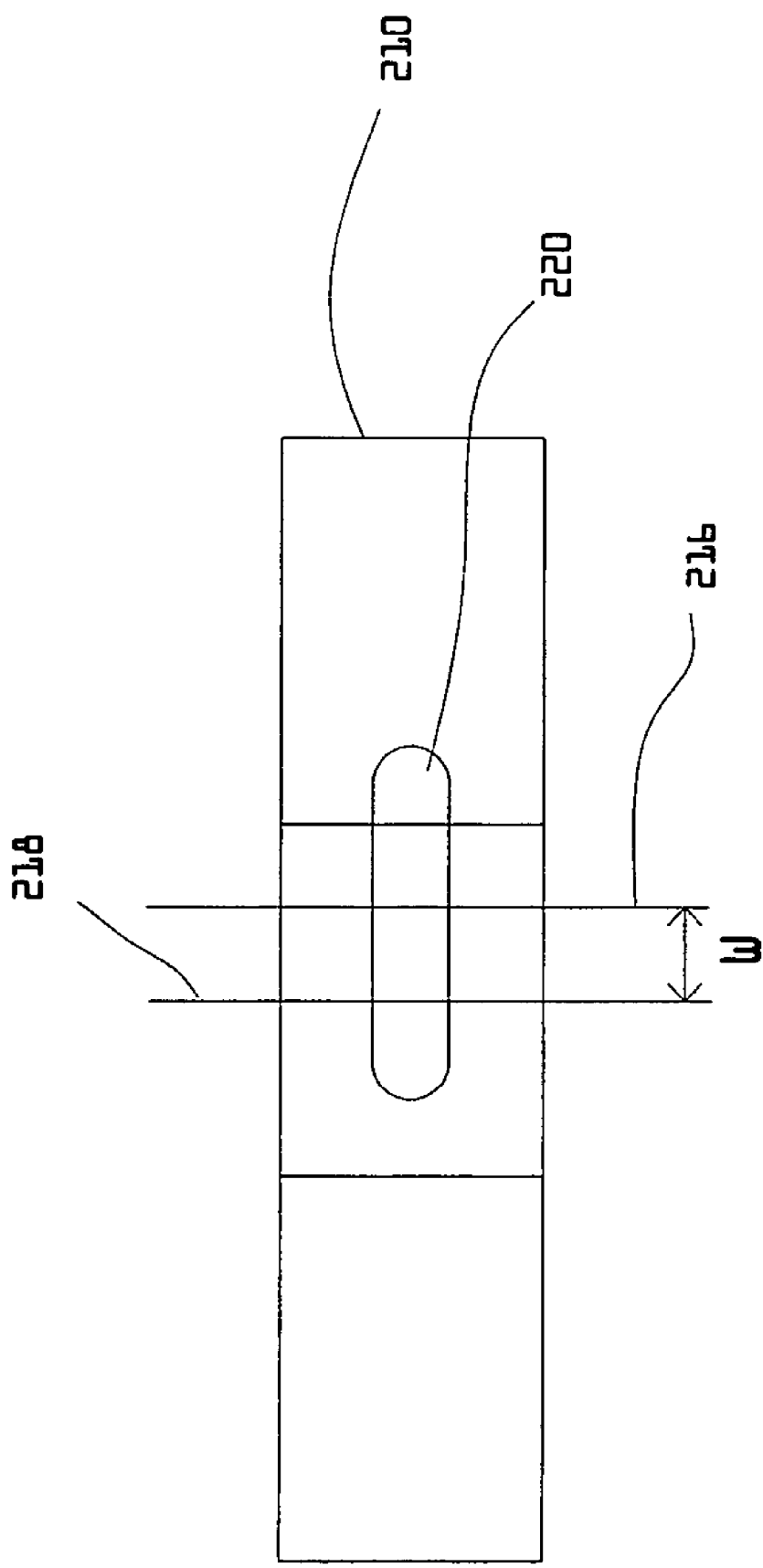
FIG. 2B is a schematic diagram showing a processed image of an air bubble with the vial in a tilted position of the level of FIG. 2A.

Referring to FIGS. 2A and 2B, a tilted non-contact electronic level 200 according to one embodiment of the present invention has a vial 202, a photo sensor 204, and an image processing unit 206. The vial 202 can be a transparent casing, such as a transparent ball. Alternatively, the vial 202 can be a transparent tube 210 filled with a first fluid and a second fluid, with the density of the first fluid being different than the density of the second fluid to enable the second fluid to form a bubble and to float on the first fluid and to move as the vial 202 tilts. In the embodiment shown in FIG. 2A, the bubble is an air bubble 214 while the first fluid is a liquid 212 and the second fluid is a gas. For simplicity, and without limiting the scope of the present invention, the first fluid shall hereinafter be referred to as the liquid 212 and the bubble shall hereinafter be referred to as the air bubble 214. The air bubble 214 is provided for receiving light from a light source 208. The light source 208 can be an electroluminescent (EL) board, a light emitting diode (LED), a light bulb, a fluorescent lamp, a cathode ray tube, or any similar device. The photo sensor 204 is located at a position corresponding to the vial 202 at a fixed distance Z, and the photo sensor 204 can be a charge coupled device, a complementary metal oxide semiconductor, or any similar device. In addition, the photo sensor 204 can be a linear photo sensor for capturing one-dimensional images of the air bubble 214, or can be an area image sensor which is capable of capturing two-dimensional images of the air bubble 214, thereby extending the capabilities of the linear photo sensor. The image processing unit 206 is electrically connected to the photo sensor 204, and can be a personal computer (PC), a micro-controller, a digital circuit, an application-specific integrated circuit (ASIC), or any similar device.

The liquid 212 is disposed inside the transparent tube 210, with the air bubble 214 floating on the surface of the liquid 212. In general, the transparent tube 210 is usually made of glass or plastic. If the vial 202 is tilted, the air bubble 214 will move to the upper section of the transparent tube 210. On the other hand, if the vial 202 is disposed in a perfectly-horizontal state, the centroid of the air bubble 214 will be located at a specific location (hereinafter referred to as "the predetermined point"), which can be the center position of the transparent tube 210. Referring to FIG. 2B, the photo sensor 204 captures the image 220 of the air bubble 214 when the transparent tube 210 is irradiated by the light source 208, and the image processing unit 206 can convert the image 220 of the air bubble 214 into an electronic level signal by comparing the centroid of the image 220 of the air bubble 214 with a predetermined point to obtain the relative displacement W (which can be a positive value) between the centroid of the air bubble image 220 and the predetermined point (i.e., the center position of the transparent tube 210) in order to determine whether or not the vial 202 is disposed in a perfectly-horizontal state.

Figure 3:
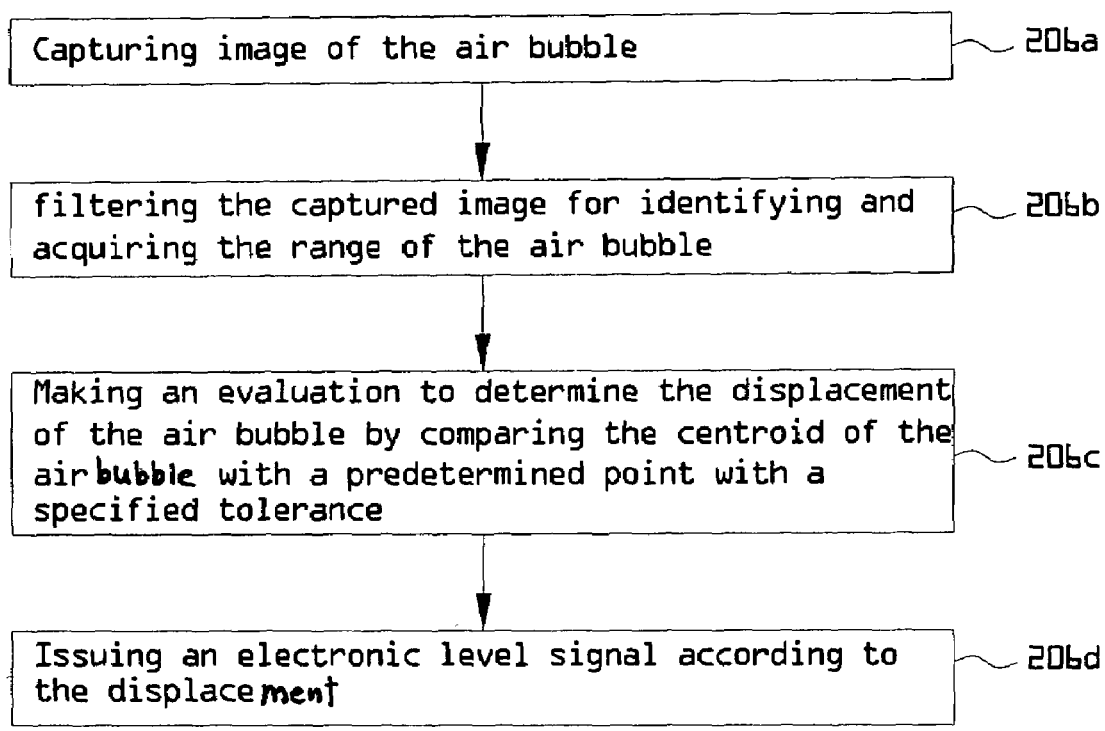
FIG. 3 is a flowchart showing a process of converting an air bubble image into an electronic level signal.

FIG. 3 is a flowchart showing a process of converting an air bubble image 220 into an electronic level signal. The conversion process starts from step 206a, where an image 220 of the air bubble 214 is captured by the photo sensor 204. The process then proceeds to step 206b, where the captured image 220 is filtered to identify and acquire the range of the air bubble 214. Thereafter, in step 206c, the image processing unit 206 makes an evaluation to determine the displacement W (see FIG. 2B) of the air bubble 214 by comparing the centroid of the image 220 of the air bubble 214 with the predetermined point (within a specified tolerance), and the process then proceeds to step 206d, where the center of the image 220 of the air bubble 214 (i.e., the centroid of the air bubble 214) can be calculated using the following formulae:

$$x = \frac{\sum_{i=1}^{n} \sum_{j=1}^{m} jB[i,j]}{A}, y = \frac{\sum_{i=1}^{n} \sum_{j=1}^{m} iB[i,j]}{A}$$

where x, y coordinates are the horizontal and vertical addresses, respectively, of any pixel or addressable point on the captured image; in which the x coordinate is a given number of pixels along the horizontal axis of a display starting from the pixel (pixel 0) on the extreme left of the image, and the y coordinate is a given number of pixels along the vertical axis of a display starting from the pixel (pixel 0) at the top of the image, so that, the x and y coordinates together locate any specific pixel location on the image;

m is the total pixel number along the horizontal axis of the image 220 of the air bubble 214;

n is the total pixel number along the vertical axis of the image 220 of the air bubble 214;

B[i,j] is the weight of the pixel (i, j), which is assigned to be 1 while the pixel is black, and is assigned to be 0 while the pixel is white; and A is the total number of pixels in the image 220 of the air bubble 214. In step 206d, an electronic level signal is issued by the image processing unit 206 according to the calculated displacement W.

Figure 4A:
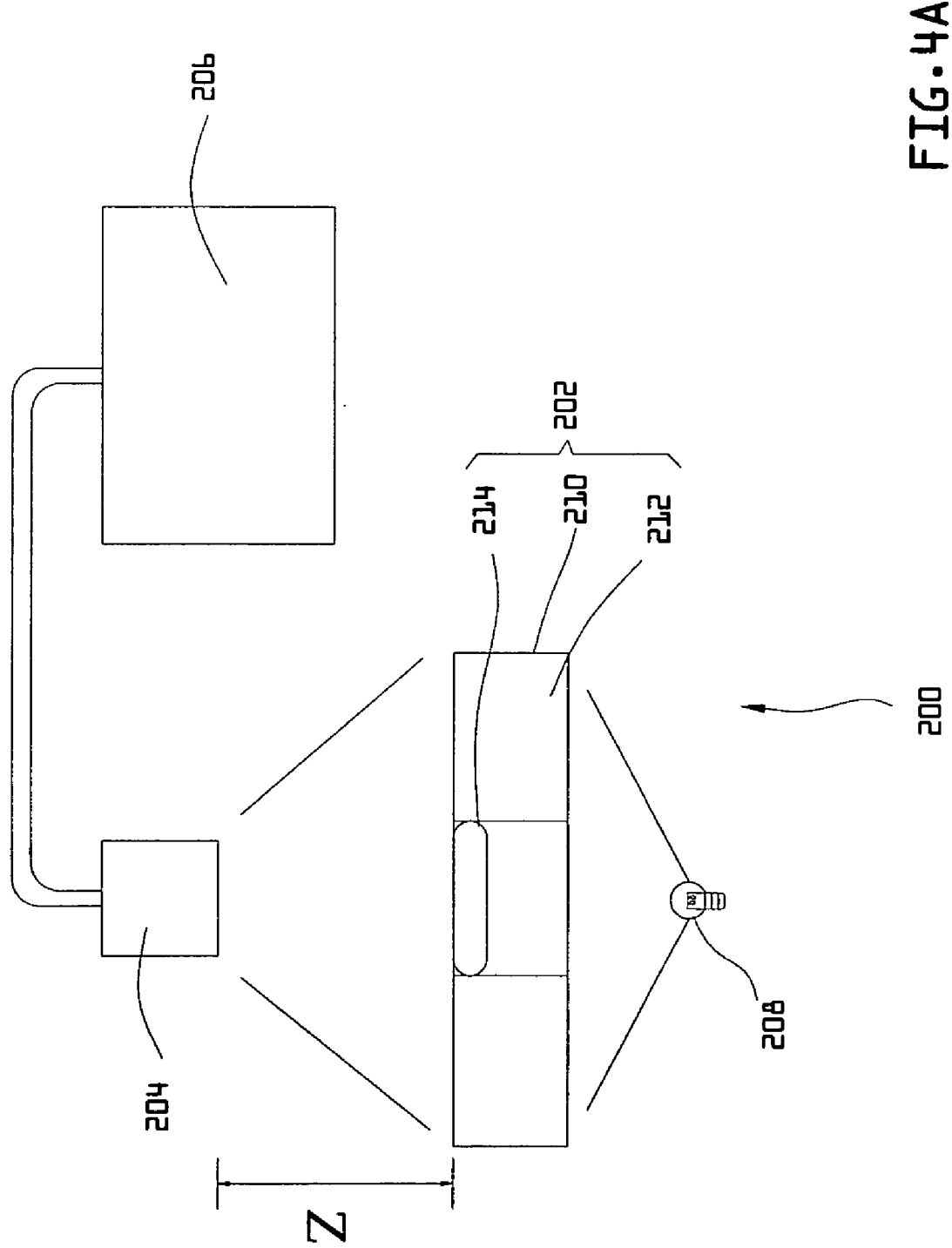
FIG. 4A illustrates the non-contact electronic level of FIG. 2A showing the vial in a perfectly-horizontal position.
Figure 4B:
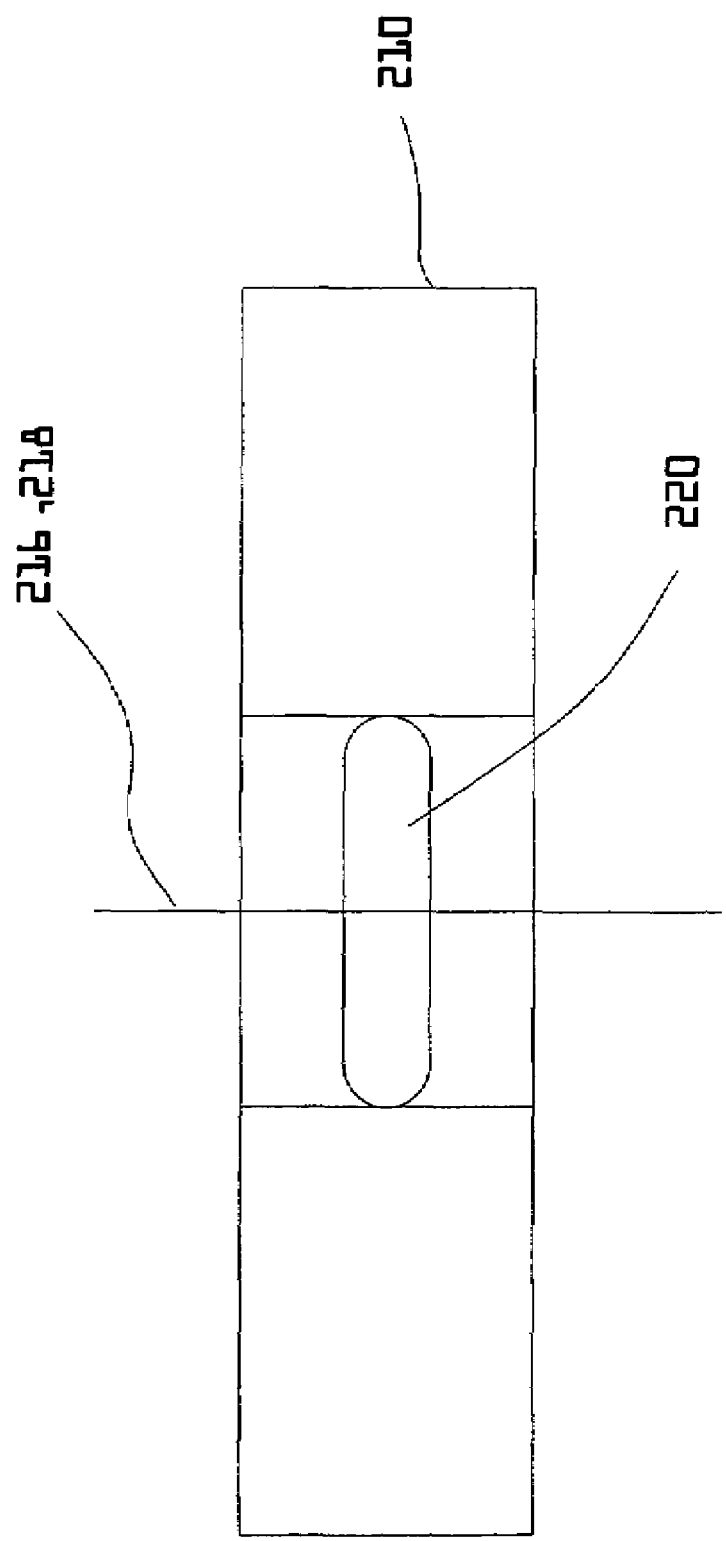
FIG. 4B is a schematic diagram showing a processed image of an air bubble with the vial in a perfectly-horizontal position of the level of FIG. 4A.

FIGS. 4A and 4B illustrate the same level 200 of FIGS. 2A and 2B when the vial 202 is disposed in a perfectly-horizontal state. After the air bubble image 220 is processed by the image processing unit 206, the relative displacement between the center position of the air bubble image 220 and the predetermined point (i.e., the center position of the transparent tube 210) is zero.

Figure 5:
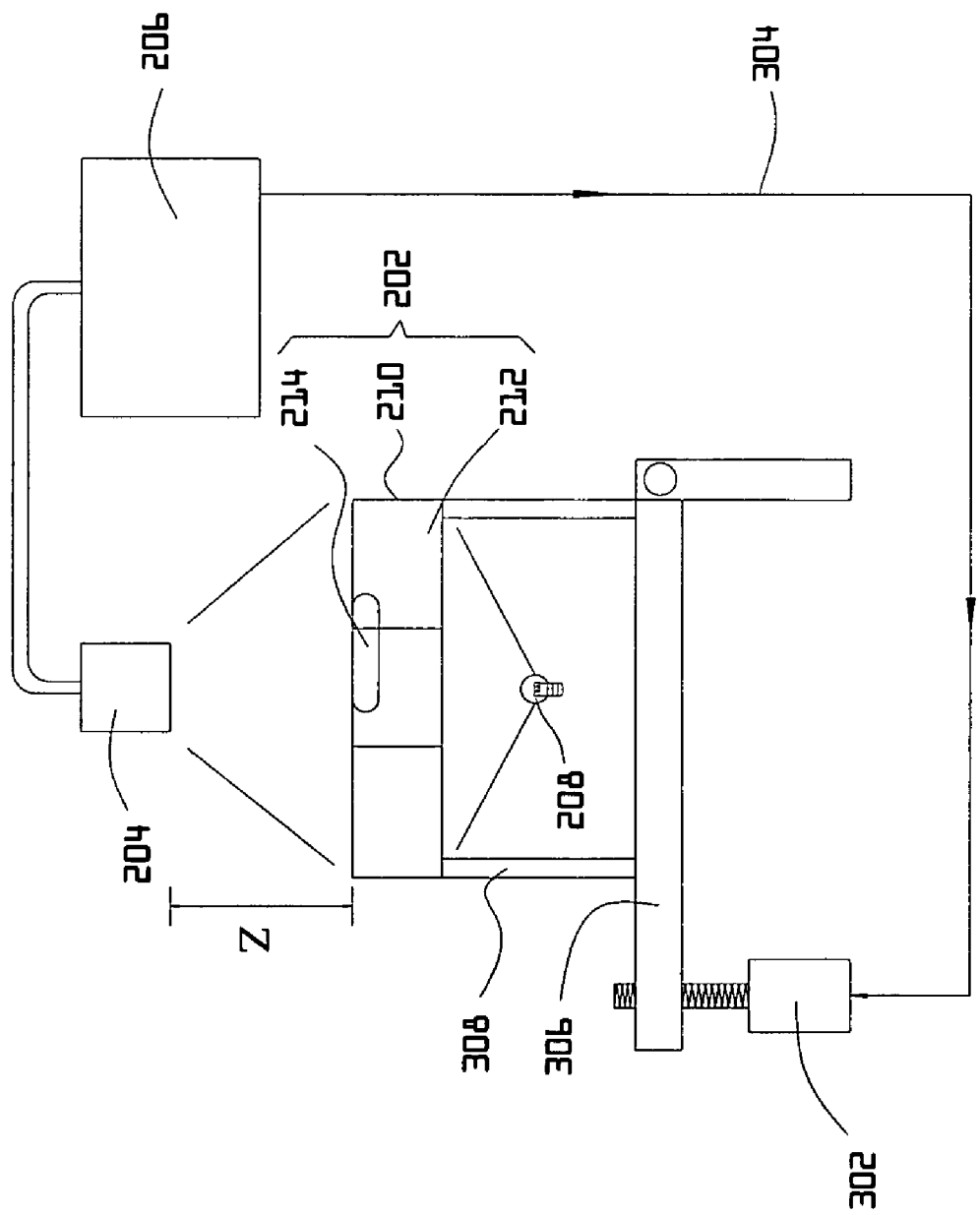
FIG. 5 illustrates the non-contact electronic level of FIGS. 2A and 4A being connected to a circuit device according to one embodiment of the present invention.

FIG. 5 shows the non-contact electronic level 200 being connected externally to a circuit device 302. The circuit device 302 can be a motor with a control circuit, and the image processing unit 206 can be used for outputting an electronic level signal 304 to the circuit device 302 as a feedback signal for controlling the circuit device 302 to adjust the inclination of the vial 202. Specifically, the photo sensor 204 captures the air bubble image 220 after the air bubble 214 is irradiated by the light source 208. An electronic level signal 304 is outputted (according to the process in FIG. 5) after the air bubble image 220 is processed by the image processing unit 206. The electronic level signal 304 serves as a feedback signal for the externally connected circuit device 302.

In addition, the vial 202 is placed on a base 308, and the base 308 is further positioned on a platform 306. After the electronic signal 304 is received by the circuit device 302, the motor of the circuit device 302 will be activated to adjust the inclination of the platform 306, thereby adjusting the inclination of the air bubble 214 to cause the vial 202 to be positioned in the perfectly-horizontal state.

Figure 6:
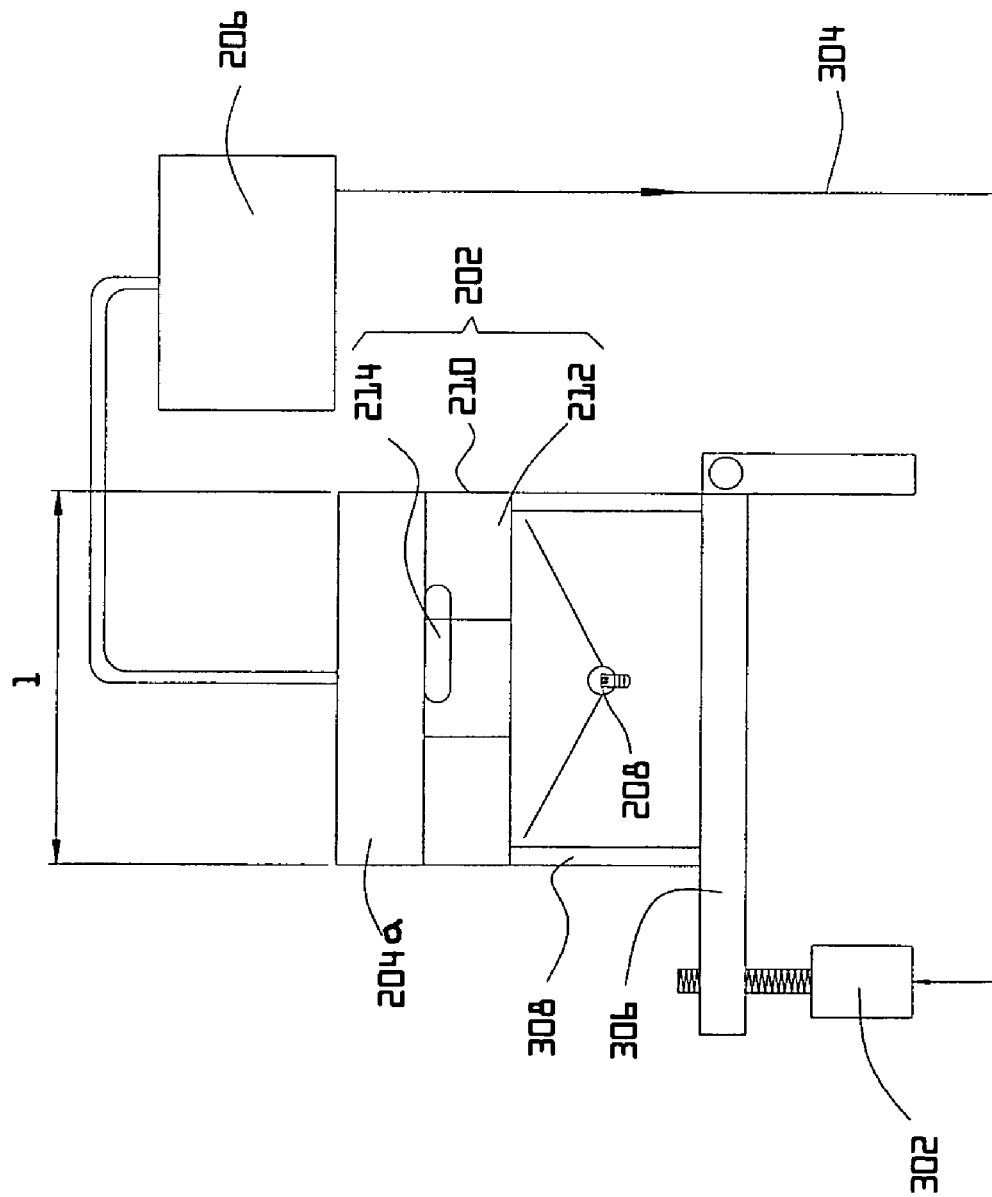
FIG. 6 illustrates a non-contact electronic level according to another embodiment of the present invention.

FIG. 6 illustrates a non-contact electronic level according to another embodiment of the present invention. The elements of the non-contact electronic level of FIG. 6 are similar to those of the non-contact electronic level of FIG. 5, so the same numeral designations are used for the same elements in FIGS. 5 and 6. The difference between the two embodiments is that the fixed distance between the photo sensor 204a and the vial 202 is omitted in FIG. 6, so that the photo sensor 204a in FIG. 6 is placed on top of, and contacts, the surface of the vial 202 at a location corresponding to the air bubble 214. In addition, the photo sensor 204a in FIG. 6 has a width L, which is at least twice the diameter of the air bubble 214.

Figure 7:
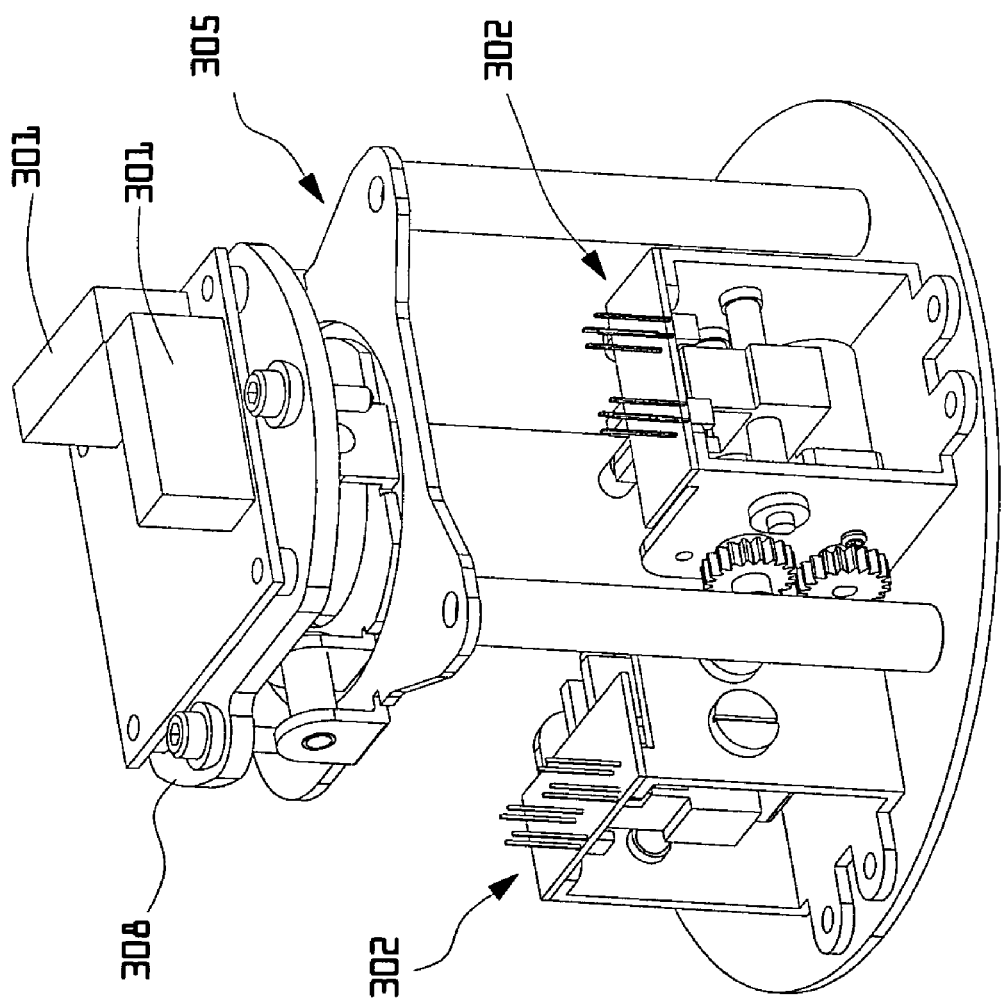
FIG. 7 is a perspective view showing the mounting of two non-contact electronic levels of FIG. 2A on a supporting mechanism.
Figure 8:
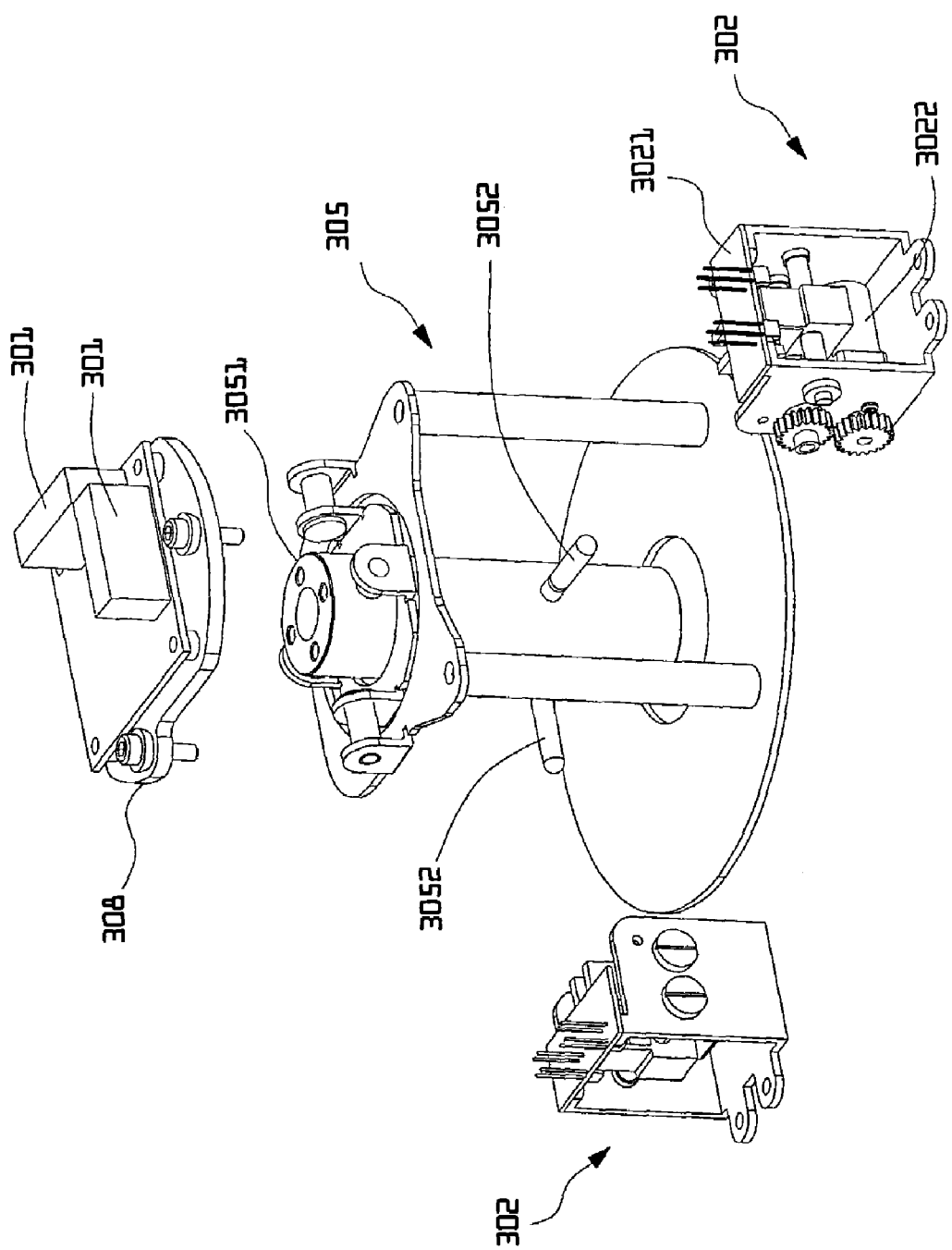
FIG. 8 is an exploded perspective view of the supporting mechanism of FIG. 7.

FIGS. 7 and 8 illustrate the mounting of a non-contact electronic level 200 on a supporting mechanism according to an embodiment of the invention, where each of two blocks 301 is used to represent a non-contact electronic level 200 of FIG. 2A. As shown in FIG. 7, the non-contact electronic level 200 is mounted on a base 308, which is further coupled to a chassis 305 having a universal bearing unit 3051 abutted against the base 308. The universal bearing unit 3051 is adjusted by at least one circuit device 302 as the control circuit 3021 of the circuit device 302 receives an electronic level signal 304 from the image processing unit 206. The non-contact electronic level 200 mounted on the supporting mechanism shown in FIG. 7 can be tilted for adjusting the position of the air bubble 214 inside the vial 202 while using a stream of continuous electronic level signals 304 as feedback control for controlling the circuit devices 302 to adjust the universal bearing unit 3051 for tilting the base 308 accordingly.

Figure 9:
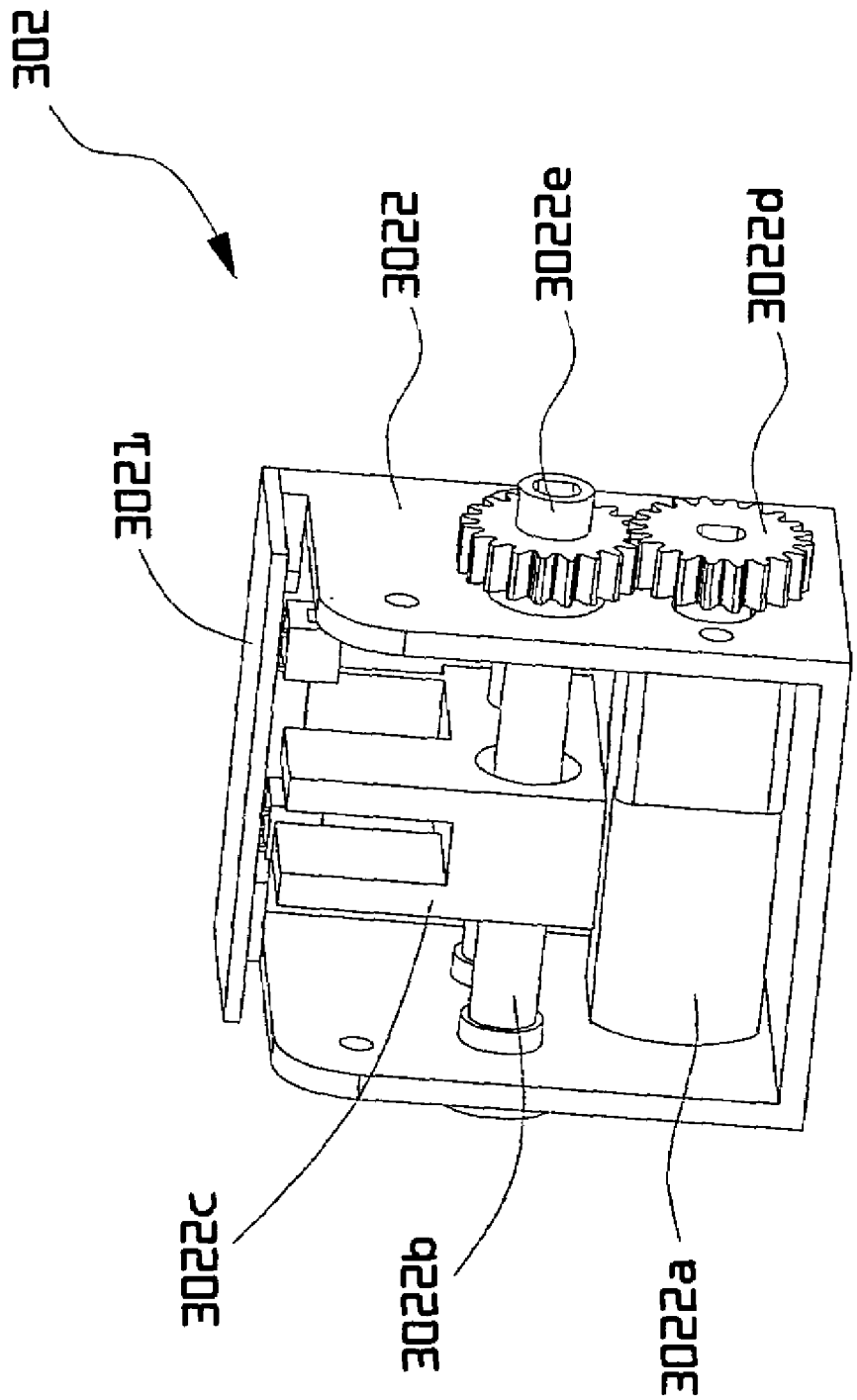
FIG. 9 is a perspective view of a circuit device of FIG. 8.

In particular, referring now to FIGS. 8 and 9, the universal bearing unit 3051 has a plurality of actuating rods 3052 attached thereto, wich each actuating rod 3052 pivotally coupled to the actuating block 3022c of the motor unit 3022 of a circuit device 302 corresponding to the particular actuating rod 3052. Therefore, as the control circuit 3021 of a circuit device 302 receives an electronic level signal 304 from the image processing unit 206 of the non-contact electronic level 200, the motor 3022a of the same circuit device 302 is activated by the control circuit 3021, and drives the gear wheel 3022d (which is coupled to the motor 3022c) to drive another gear wheel 3022e which is meshed with the gear wheel 3022d. The gear wheel 3022e is coupled to a screw rod 3022b such that the actuating block 3022c mounted on the screw rod 3022b can adjust the actuating rod 3052 coupled to it, thereby enabling the universal bearing unit 3051 to tilt the base 308.

Figure 10:
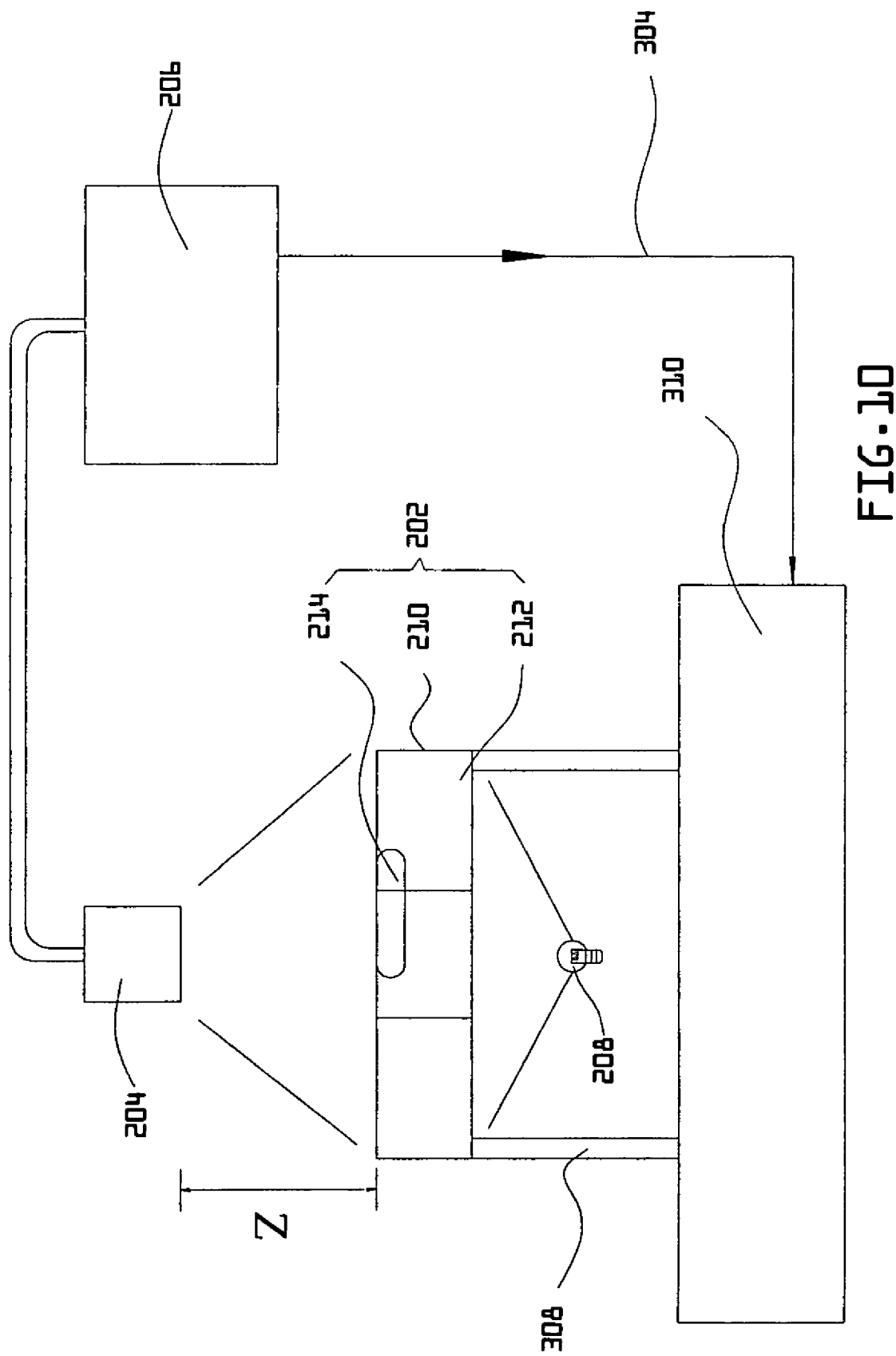
FIG. 10 illustrates the non-contact electronic level of FIGS. 2A and 4A being connected to a testing object according to one embodiment of the present invention

FIG. 10 shows the non-contact electronic level 200 being connected to a testing object. In FIG. 10, the non-contact electronic level 200 can be placed on a testing object 310, such as a protractor, a measuring device, or a measuring instrument required to be set up horizontally with high precision, so as to measure the inclination of testing object 310.

Throughout the various embodiments of the present invention, the photo sensor 204 is used to capture the image of the air bubble 214, and the image processing unit 206 is used to process the air bubble image 220 to output a high-precision electronic level signal 304. However, the air bubble image 220 can be captured and processed by other known devices, and is not limited to the photo sensor 204 and the image processing unit 206.

In summary, the non-contact electronic level 200 of the present invention has at least the following advantages:

1. The non-contact electronic level 200 uses the photo sensor 204 to capture the air bubble image 220 and precisely detect the position of the air bubble 214 regardless of whether the level 200 is in a dynamic state or in a static state for the image processing unit 206 to output a precise electronic level signal 304 as a basis for determining the horizontal level.

2. The non-contact electronic level 200 uses the image processing unit 206 to process the air bubble image 220 and to correctly compute the distance between the center position 216 of the air bubble 214 and the center position 218 of the transparent tube 210, so as to determine the inclination of the vial 202 or the testing object 310.

3. After the air bubble image 220 of the non-contact electronic level 200 is processed by the image processing unit 206, a precise electronic level signal 304 can be outputted as a feedback signal to the externally connected circuit device 302 for adjusting the inclination of the vial 202.

4. The temperature of the environment will not affect the performance of the non-contact electronic level 200 because the level 200 uses a non-contact measuring method.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A non-contact electronic level, comprising:
   a light source;
   a vial having a bubble and positioned to be irradiated by light from the light source;
   a photo sensor located at a position corresponding to the bubble at a fixed distance from the vial, the photo sensor capturing an image of the bubble after the vial is irradiated by the light source; and
   an image processing unit electrically coupled to the photo sensor for converting the image of the bubble into an electronic level signal by comparing the centroid of the image of the bubble with a predetermined point;
   wherein the x, y coordinates of the centroid is calculated using the following formulae:

$$x = \frac{\sum_{i=1}^{n}\sum_{j=1}^{m} jB[i,j]}{A}, y = \frac{\sum_{i=1}^{n}\sum_{j=1}^{m} iB[i,j]}{A}$$

where m is the total pixel number along the horizontal axis of the image of the bubble, n is the total pixel number along the vertical axis of the image of the bubble, B is the weight of the pixel (i, j), and A is the total number of pixels in the image of the bubble.

2. The level of claim 1, wherein the vial has a transparent casing, a gas and a liquid, with the liquid disposed inside the transparent casing and the gas floating on the liquid to form the bubble such that the bubble moves when the vial tilts.

3. The level of claim 2, wherein the predetermined point is a center position of the transparent casing.

4. The level of claim 1, wherein the image processing unit converts the image of the bubble into an electronic level signal by:
   filtering the image of the bubble for identifying the range of the bubble;
   evaluating the centroid of the bubble;
   comparing the centroid of the bubble with the predetermined point to determine a displacement of the bubble; and
   issuing an electronic level signal based on the displacement.

5. The level of claim 1, wherein the light source is selected from the group that includes an electroluminescent board, a light emitting diode, a light bulb, a fluorescent lamp, and a cathode ray tube.

6. The level of claim 1, wherein the width of the photo sensor is at least twice the diameter of the bubble.

7. The level of claim 1, wherein the photo sensor is selected from the group that includes a charge coupled device and a complementary metal oxide semiconductor.

8. The level of claim 1, wherein the image processing unit is selected from the group that includes a personal computer, a micro-controller, a digital circuit, and an application specific integrated circuit.

9. The level of claim 1, further comprising:
a base that supports the vial, the light source and the photo sensor;
a chassis having an actuating rod pivotally coupled to the base; and
a circuit device capable of receiving the electronic level signal so as to drive the actuating rod and adjust the inclination of the base.

10. A method of measuring a level, comprising the steps of:
using a light source to irradiate a vial having a bubble therein;
capturing an image of the bubble after the vial is irradiated by the light source;
filtering the image of the bubble for identifying the range of the bubble;
calculating the x, y coordinates of the centroid of the image of the bubble using the following formulae:

$$x = \frac{\sum_{i=1}^{n}\sum_{j=1}^{m} jB[i,j]}{A}, y = \frac{\sum_{i=1}^{n}\sum_{j=1}^{m} iB[i,j]}{A}$$

where m is the total pixel number along the horizontal axis of the image of the bubble, n is the total pixel number along the vertical axis of the image of the bubble, B is the weight of the pixel (i, j), and A is the total number of pixels in the image of the bubble; and converting the image of the bubble into an electronic level signal by comparing the centroid of the image of the bubble with a predetermined point.

11. The method of claim 9, further comprising:
adjusting the inclination of the bubble based on the electronic level signal.

12. The method of claim 9, further comprising:
using the electronic level signal as a feedback signal for a circuit device for adjusting the inclination of the bubble.

13. A non-contact electronic level, comprising:
a vial having an bubble;
a photo sensor located at a position corresponding to the bubble at a fixed distance from the vial, the photo sensor capturing an image of the bubble; and
an image processing unit electrically coupled to the photo sensor and converting the image of the bubble into an electronic level signal by comparing the centroid of the image of the bubble with a predetermined point;
wherein the x, y coordinates of the centroid is calculated using the following formulae:

$$x = \frac{\sum_{i=1}^{n}\sum_{j=1}^{m} jB[i,j]}{A}, y = \frac{\sum_{i=1}^{n}\sum_{j=1}^{m} iB[i,j]}{A}$$

where m is the total pixel number along the horizontal axis of the image of the bubble, n is the total pixel number along the vertical axis of the image of the bubble, B is the weight of the pixel (i, j), and A is the total number of pixels in the image of the bubble.

* * * * *